United States Patent [19]

Aboshi et al.

[11] 4,041,002
[45] Aug. 9, 1977

[54] THERMOPLASTIC RESIN COMPOSITION

[75] Inventors: Michihiro Aboshi, Tokyo; Tsutomu Kakutani, Tama; Katsumi Yoshitake, Kawasaki; Toshinori Koseki, Tokyo, all of Japan

[73] Assignee: Asahi Kasei Kogyo Kabushiki Kaisha, Osaka, Japan

[21] Appl. No.: 601,173

[22] Filed: Aug. 1, 1975

Related U.S. Application Data

[63] Continuation-in-part of Ser. No. 452,690, March 19, 1974, abandoned, which is a continuation-in-part of Ser. No. 429,083, Dec. 28, 1973, abandoned.

[51] Int. Cl.$^2$ .............. C08K 5/01; C08K 5/09; C08K 5/10; C08K 5/49
[52] U.S. Cl. .............. 260/30.6 R; 260/31.2 R; 260/31.2 N; 260/31.6; 260/31.8 R; 260/31.8 M; 260/31.8 N; 260/33.2 R; 260/33.6 R; 260/33.6 UA; 260/857 L; 260/897 B
[58] Field of Search .............. 260/30.6 R, 31.2 R, 260/31.2 N, 31.2 XA, 31.6, 31.8 R, 31.8 M, 31.8 N, 31.8 XA, 33.2 R, 33.6 R, 33.6 UA, 857 L, 897 B

[56] References Cited

U.S. PATENT DOCUMENTS

| | | | |
|---|---|---|---|
| 3,010,899 | 11/1961 | Boyer | 260/33.6 UA |
| 3,310,608 | 3/1967 | Matsubayashi et al. | 260/897 B |
| 3,375,219 | 3/1968 | Robb | 260/857 L |
| 3,548,028 | 12/1970 | Itabashi et al. | 260/857 L |
| 3,657,202 | 4/1972 | Hammer et al. | 260/897 B |
| 3,684,778 | 8/1972 | Hammer | 260/897 B |
| 3,702,314 | 11/1972 | Farjon et al. | 260/897 B |
| 3,704,275 | 11/1972 | Burg et al. | 260/897 B |

OTHER PUBLICATIONS

Modern Plastics Encyclopedia 1968, (McGraw-Hill), (N.Y.), (Sept. 1967), pp. 478–483.

Primary Examiner—Donald E. Czaja
Assistant Examiner—H. H. Fletcher
Attorney, Agent, or Firm—Cooper, Dunham, Clark, Griffin & Moran

[57] ABSTRACT

Thermoplastic resin compositions of improved lubricity and wear resistance are prepared without sacrificing the excellent moldability which is inherent in thermoplastic resins which compositions comprise a base resin, a lubricant and an ethylene-vinyl acetate copolymer.

5 Claims, No Drawings

THERMOPLASTIC RESIN COMPOSITION

RELATED APPLICATIONS

This application is a continuation-in-part of application Ser. No. 452,690 filed Mar. 19, 1974, which is, in turn, a continuation-in-part of application Ser. No. 429,083 filed Dec. 28, 1973, both now abandoned.

BACKGROUND OF THE INVENTION

In order to improve the lubricity and the wear resistance of thermoplastic resins such as nylon and polyacetal which have been used as bearing materials, etc., it has been the practice to incorporate into these resins liquid or solid lubricants such as molybdenum disulfide, graphite and polytetrafluoroethylene.

However, molybdenum disulfide, polytetrafluoroethylene and the like are expensive and do not achieve the desired results to a high degree. Moreover, their presence adversely affects the moldability of the resin. A particular problem is that when nylon, polyacetal or similar thermoplastic resin with an added lubricant is subjected to a molding process such as by extrusion molding or screw injection molding technique, the blend fails to fill the molding cavity completely and conform faithfully to its contours. Consequently, the desired molded products are not obtained. To avoid the difficulty, compression molding or the method whereby a sintered resin is immersed in a liquid lubricant are normally employed. With these methods, however, it is difficult to efficiently produce large numbers of molded products of complicated shapes.

Recently a method has been disclosed which enables an oil to be incorporated in nylon or polyacetal (Japanese Official Gazette of Patent Publication No 5321/1971). This method requires the resin to be treated at an elevated temperature for an extended period of time in the lubricant oil. Unfortunately, this gives rise to the possiblity of degradation of the resin. In addition, this method requires special mechanical equipment which increases the cost and decreases the productivity. Moreover, pellets produced by this method, when subjected to extrusion molding or screw injection molding, tend to bleed out the lubricant which seriously impairs the efficiency of the molding machine. This method, despite elaborate precautions produces molded products in which the surface is wet with lubricant.

It has now been discovered that the addition of a third component, namely an ethylene-vinyl acetate copolymer substantially alleviates the problems aforesaid, and permits the production of molded products of complicated design which have excellent lubricity without a wet surface, and excel in wear resistance. Moreover, the products can be produced at high production rates.

SUMMARY OF THE INVENTION

The compositions of this invention are novel resin compositions excelling in moldability, lubricity and wear resistance, which composition comprise from 55 to 99.5 percent by weight of thermoplastic resin, from 0.3 to 25 percent by weight of a lubricant and from 0.2 to 20 percent by weight of an ethylene-vinyl acetate copolymer in such amounts to make up 100 percent by weight.

DETAILED DESCRIPTION OF THE INVENTION

Any of a wide variety of thermoplastic resins may be employed as the principal component of the compositions of this invention. These include, for example, polyacetal, nylon, polyethylene, polypropylene, polyphenylene sulfide and polysulfone. The invention is particularly useful with polyacetals or nylons which are used in bearings and gears and have excellent solvent resistance. Typically useful polyacetals include homopolymers or copolymers containing 1 to 10 mol % of a cyclic ether. Typically useful nylons include nylon 6, nylon 6.6, nylon 6.10 or nylon 6.12.

When the compositions contain appreciably more than 99.5 percent by weight resin the desired effect of the lubricant upon lubricity and wear resistance is not achieved. When less than 55 percent by weight is employed the products are not sufficiently rigid. The preferred compositions contain from 70 to 98 percent by weight, respectively based on the weight of the composition.

Substantially any liquid lubricant which does not dissolve the resin can be used. These include, for example, paraffins of the type which are solid at normal room temperature and which become liquid during the production of the composition of this invention. Typical examples of desirable liquid lubricants include paraffin, naphthene, and aromatic type oils, polyalkylene glycol type oils, ester type oils, e.g. mono- and polyalcohol esters of organic and inorganic acids such as monobasic fatty acids, dibasic fatty acids, phthalic acid and phosphoric acid. Blends of these oils may also be employed.

The amount of the lubricant is generally from 0.3 to 25 percent, preferably between 1 to 15 percent, by weight based on the weight of the composition. When the amount of the lubricant is appreciably less than 0.3 percent by weight, the lubricant's effort upon lubricity and wear resistance is substantially lost. If the amount substantially exceeds 25 percent by weight, however, the stiffness of the finished composition is seriously affected.

The ethylene-vinyl acetate copolymer absorbs the lubricant and swells, but does not dissolve in the lubricant at normal room temperature. Ethylene-vinyl acetate copolymers used in this invention normally contain from 15 to 50 percent, preferably 19 to 28 percent, by weight of vinyl acetate comonomer. Melt index (MI) of the copolymer is typically from 0.1 to 300 g/10 min. as measured by ASTM D1238.

The amount of ethylene-vinyl acetate copolymer employed in the compositions of the invention is normally from 0.2 to 20 percent, preferably from 1 to 15 percent, by weight. When the amount of ethylene-vinyl acetate copolymer is noticeably less than 0.2 percent by weight, the ability of the composition to provide good transporting property of the screw during the molding operation is decreased. When the amount appreciably exceeds 20 percent by weight, however, the stiffness of the composition is seriously lowered.

In addition to the base resin, the lubricant and the ethylene-vinyl acetate copolymer described hereinabove, the compositions of this invention can include the usual reinforcing agents, extenders, additives, etc., which are generally employed with such resins. These may also include solid lubricants such as graphite, molybdenum disulfide, fluorocarbon resins and metallic soaps; inorganic filters; glass fiber; pigments; flame retardants; antistatic agents and various stabilizers.

The combination of the aforementioned three essential components, that is, base resin, lubricant and ethylenevinyl acetate copolymer, must be selected properly bearing in mind their respective properties. When resins such as polyphenylene sulfides or polysulfones which have relatively high molding temperatures are employed as the base resin, the lubricant selected should be capable of withstanding high molding temperatures.

The mixer utilized for producing the compositions of this invention may be any of those readily available mixers which have the necessary heat production and mixing capabilities. For example, high-speed fluid mixing devices such as the Henschel mixer, ribbon blenders and the like are advantageously used. Devices which are not adapted to permit heating may be used if the individual components of the resin composition are heated in advance.

In one typical method employed for producing the compositions of this invention, the base resin in the form of powder or pellets, the lubricant and the ethylene-vinyl acetate copolymer in the form of powder or pellets are agitated and mixed at a temperature below the melting point of the base resin or, in the case of a non-crystalline resin, at a temperature below the point at which the resin melts and coagulates, until the lubricant has thoroughly been absorbed by the ethylene-vinyl acetate copolymer. This usually requires about ten minutes, although it may vary appreciably depending on the quantities of the components, the rate of mixing, the particular resin and lubricant selected and the temperature. The composition thus produced may be pelletized in an extruding device and the pellets thereafter molded. In this case, the amount of the lubricant employed is from 0.2 to 8 times that of the ethylene-vinyl acetate copolymer, so as to obtain the desired results with respect to friction property and wear resistance and transporting property of the screw of the extruding device.

Alternatively, the compositons may be prepared by initially mixing the base resin and the ethylene-vinyl acetate copolymer, and subsequently introducing the lubricant dropwise into the resultant mixture while under agitation so that it may be absorbed into the mixture.

The compositions may also be produced by first introducing the lubricant dropwise into the ethylene-vinyl acetate copolymer while under agitation and, after the lubricant has thoroughly been absorbed, adding the base resin to the resultant mixture. Thus, the sequence of mixing, the method of addition of the lubricant, the method of heating the mixture, etc., may advantageously be selected from a variety of possibilities.

For optimum convenience, the base resin and the ethylene-vinyl acetate copolymer selected for the production of the compositions of this invention are normally in the form of finely divided particles capable of passing a sieve of a mesh size 10. This is not essential, however, They may be used in the form of pellets.

The pellets formed by any of the methods described above may be utilized directly for extrusion or injection molding. It is not necessary to form the compositions into pellets, however, since they can be formed and utilized in any of a variety of geometrical configurations.

Compared with the lubricant-containing resin obtained by the sintering method or the method disclosed by the Japanese Official Gazette of Patent Publication No. 5321/1971 which has heretofore been used, the pelletized composition of the present invention suffers far less from the phenomenon of heat degradation due to prolonged heating. Moreover, since no special equipment is required, molded products can be produced in large quantities in a short period of time.

The pelletized compositions of this invention can be utilized for injection, extrusion, or blow molding and similar procedures, with the transporting property of the screw improved to a great extent. The compositions in a pulverized form can be used in rotational molding.

In addition to improved moldability, other factors which contribute to the value of the novel compositions of this invention are improved lubricity and wear resistance. Conventional compositions include only the resin and the lubricant. The products of this invention, however, additionally contain an ethylene-vinyl acetate copolymer system. The copolymer retains the lubricant in an abosorbed state so that bleed out of the lubricant on the resin surface is minimized. The lubricity and wear resistance offered by this composition immediately after molding is equivalent to that of the conventional systems. However, even after a prolonged service, the surface of the molded product is wetted only slightly as a result of bleeding out of the lubricant. Thus, the surface does not become sticky and the abrasion resistance is not degraded.

The mold shrinkage and impact resistance of the compositions obtained in accordance with the present invention are also excellent.

the following non-limiting examples are given by way of illustration only.

Examples 1 and 2 and Comparative Examples 1-1, 1-2, 1-3, 2-1, 2-2 and 2-3:

Polyacetal homopolymer (MI 7.0 g/10 min. 190° C) or nylon 6 (relative viscosity is sulfuric acid 2.5) in the powdered form was used as the thermoplastic resin, a paraffin type oil (SUS 460 100° F) or naphthene type oil (SUS 370 100° F) was used as the lubricant, and ethylene-vinyl acetate copolymers (EVA MI 150 g/10 min. and having a vinyl acetate content of 19 percent by weight; MI 15 g/10 min. and having a vinyl acetate content of 28 percent by weight) in the powdered form were used as the ethylene-vinyl acetate copolymer, respectively in amounts to give percent compositions shown in Table 1. Each charge was mixed while heating in a Henschel mixer at temperatures below the point at which the resins would be melted and converted into a viscous solidified mass. The resultant mixture composition was pelletized by means of an extruder.

In Comparative Examples 1-2, 2-2 and 2-3, the preparation of pellets was carried out in accordance with the method disclosed in the Japanese Official Gazette of Patent Publication No. 5321/1971.

These pellets and pellets of polymers used as base resins were subjected to injection molding. The results are shown in Table 1. As is clear from this table, the pellet compositions according to this invention could be injection molded in the same way as the pellets of base resins to afford test pieces with good lubricity, wear resistant and high dimensional accuracy, whereas the pellet compositions of the resin = lubricant system could not be injection molded because of inferior transporting property of the screw. Consequently, wear resistant test pieces with good lubricity were obtained from these compositions by using the compression molding technique.

The results of the lubricity and wear resistance test performed on such test pieces are shown in Table 1. As is clear from this table, the compositions according to this invention are superior to the conventional lubricant-containing resin compositions in molding property, particularly in terms of transporting property of the screw and decreased bleed out. As concerns the properties of lubricity and wear resistance, they showed a lower friction coefficient than the base resins. The state of wear was satisfactory and equivalent to that of the conventional lubricant-containing resin composition. Thus, the improved properties of the resin compositions of this invention were evident.

Examples 3-1, 3-2, 3-3, 3-4, 3-5, 3-6, 3-7, 3-8, 3-9, 3-10, 3-11, and Comparative Examples 3-1, 3-2, 3-3, 3-4, 3-5, 3-6, 3-7 and 3-8:

The compositions of the formulations shown in Example 1 and Example 2 were combined with the other formulations shown in Table 2-1 and Table 2-2, subjected to test molding, and thereafter tested for physical properties.

For comparison, compositions having the proportions of components varied so as to be outside of the stated range of formulation were subjected to the same test. The results are included in said table.

As is apparent from Table 2-1 and Table 2-2, molded products of compositions using resins in amounts smaller than the lower limit of said range exhibited lower stiffness and those of compositions using lubricants in amounts smaller than the lower limit failed to produce the effect of lubricant upon lubricity and wear resistance. It is also apparent that the transporting property of the screw was adversely affected when the ratio of lubricant and ethylene-vinyl acetate copolymer were increased beyond their respective upper limits and that the lubricant's effect upon lubricity and wear resistance was lost when their ratio were decreased below their respective lower limits.

Examples 4, 5 and 6 and Comparative Examples 4-1, 4-2, 4-3, 5-1, 5-2, 5-3, 6-1, 6-2 and 6-3.

The procedures of Examples 1 and Comparative Examples 1-1, 1-2 and 1-3 were repeated, except polyacetal homopolymers containing glass fiber, molybdenum disulfide ($MoS_2$) and graphite respectively were used in place of base polymers. The resultant compositions were tested for moldability and physical properties.

The results are shown in Table 3. From the table, the effects of the Compositions (Example 4, 5 and 6) according to the present invention were evident as in the case of Example 1.

Examples 7, 8, 9, 10, 11, 12, 13, 14, 15, 16, 17 and 18:

The procedures of Example 1 and Example 2 were repeated, except aromatic type oil (having aromatic content of 50% by weight, 15 cst, 100° F), polyalkylene glycol oil (35 cst, 100° F), butyl stearate, dioctyl sebacate, dioctyl phthalate and tricresyl phosphate were used in place of the lubricants of Example 1 and Example 2. The resultant compositions were tested for moldability and physical properties.

The results are shown in Table 4. From the table, the effects of the compositions were evident as in the case of Example 1 and Example 2.

Examples 19, 20, 21, 22 and 23:

The procedures of Examples 2 were repeated, except acetal copolymer (copolymer of trioxan and cyclic ether, MI 13.0 g/10 min. 190° C), nylon 6.6 (relative viscosity in sulfuric acid 2.5), nylon 6.10 (relative viscosity in sulluric acid 2.6) nylon 6 containing glass fiber and nylon 6.6 containing graphite were used in place of nylon 6. The resultant compositions were tested for moldability and physical properties.

The results are shown in Table 5. From the table, the effects of the compositions were evident as in the case of Example 1.

Table 1

| Test for moldability & physical properties (1) | Formulation (percent by weight) | | | Moldability | | | Friction property and wear resistance test (test condition-resin-to-resin under load of 2 kg/cm²) | | Surface wetting of molded product with bleeded out oil |
|---|---|---|---|---|---|---|---|---|---|
| | Base resin | Lubricant | Ethylene-vinyl acetate copolymer | Molding process | Cylinder temperature (° C) | Cycle time (sec) | Friction coefficient (μ) (linear speed 1 cm/sec) | Condition of wear | |
| Example 1 | Polyacetal (90) | Paraffin type oil (5) | EVA (vinyl acetate content 19% by weight) (5) | Injection molding | 200 | (45) | 0.10 – 0.15 | Absolutely no wear observed. | Practically no wetting |
| Comparative Example 1-1 | Polyacetal (100) | — | — | Injection molding | 200 | (45) | 0.30 – 0.35 | Worn powder appeared over about 10 cm/sec | None |
| Comparative Example 1-2 | Polyacetal (95) | Paraffin type oil (5) | — | Injection molding | 200 | (∞) Poor transportation | — | — | — |
| Comparative Example 1-3 | Polyacetal (95) | Paraffin type oil (5) | — | Compression molding | — | — | 0.10 – 0.15 | Absolutely no wear observed. | Unusually heavy wetting observed |
| Example 2 | Nylon (90) | Naphthene type oil (5) | EVA (vinyl acetate content 28% by | Injection molding | 210 | (60) | 0.05 – 0.10 | Absolutely no wear observed. | Practically no wetting |

Table 1-continued

| Test for moldability & physical properties (1) | Formulation (percent by weight) | | | Moldability | | | Friction property and wear resistance test (test condition-resin-to-resin under load of 2 kg/cm²) | | Surface wetting of molded product with bleeded out oil |
|---|---|---|---|---|---|---|---|---|---|
| | Base resin | Lubricant | Ethylene-vinyl acetate copolymer | Molding process | Cylinder temperature (°C) | Cycle time (sec) | Friction coefficient (μ) (linear speed 1 cm/sec) | Condition of wear | |
| Comparative Example 2-1 | Nylon (100) | — | — | Injection molding | 210 | (60) | 0.40 – 0.45 | Worn powder appeared over about 10 cm/sec. | None |
| Comparative Example 2-2 | Nylon (95) | Naphthene type oil (5) | — | Injection molding | 210 | (∞) Poor transportation | — | — | — |
| Comparative Example 2-3 | Nylon (95) | Naphthene type oil (5) | — | Compression molding | — | — | 0.05 – 0.10 | Absolutely no wear observed. | Unusually heavy wetting observed. |

Table 2-1

Test for moldability and physical properties (2-1)

| Test for moldability & physical properties (2-1) | Formulation (percent by weight) | | | | Degree of pelletization of composition | Moldability (by injection molding) | | Friction property and wear resistance test (test condition-resin-to-resin, under load of 2 kg/cm²) | | Surface wetting of molded product with bleeded out oil |
|---|---|---|---|---|---|---|---|---|---|---|
| | Poly-acetal | Paraffin type oil | EVA (vinyl acetate content: 19% by weight) | Oil (wt%) / EVA (wt%) | | Cylinder temperature | Cycle time (sec) | Friction coefficient (μ) (linear speed 1 cm/sec.) | Condition of wear | |
| Example 3-1 | 90 | 5 | 5 | 1 | Good | 200 | 45 | 0.10 – 0.15 | Absolutely no wear observed. | Practically no wetting |
| Comparative Example 3-1 | 99.9 | 0.05 | 0.05 | 1 | Good | 200 | 45 | 0.30 – 0.35 | Worn powder appeared over 10 cm/sec. | None |
| Example 3-2 | 99 | 0.5 | 0.5 | 1 | Good | 200 | 45 | 0.20 – 0.25 | Absolutely no wear observed. | None |
| Example 3-3 | 70 | 15 | 15 | 1 | Good | 200 | 45 | 0.10 – 0.15 | Absolutely no wear observed. | Practically no wetting |
| Comparative Example 3-2 | 40 | 30 | 30 | 1 | Pelletization was difficult because of low stiffness | 200 | 50 | 0.15 – 0.20 | Sample was deformed because of low stiffness. | Wetting |
| Comparative Example 3-3 | 90 | 9.9 | 0.1 | 99 | No transportation was obtained with extruder. | — | — | — | — | — |
| Example 3-4 | 90 | 6.7 | 3.3 | 2 | Good | 200 | 45 | 0.10 – .015 | Absolutely no wear observed. | Practically no wetting |
| Example 3-5 | 90 | 3.3 | 6.7 | 0.5 | Good | 200 | 45 | 0.10 – 0.15 | Absolutely no wear observed. | Practically no wetting |
| Comparative Example 3-4 | 90 | 0.1 | 9.9 | 0.01 | Good | 200 | 45 | 0.30 – 0.35 | Worn powder appeared over 15 cm/sec. | None |

Table (2-2)

Test for moldability and physical properties (2-2)

| Test for moldability & physical properties (2-2) | Formulation (percent by weight) | | | | Degree of Pelletization of composition | Moldability (by injection molding) | | Lubricity & wear resistance test (test condition-resin-to-resin under load of 2 kg/cm²) | | Surface wetting of molded product from bleed out oil |
|---|---|---|---|---|---|---|---|---|---|---|
| | Nylon-6 | Paraffin type oil | EVA (vinyl acetate content 19% by weight) | Oil (wt %) EVA (wt %) | | Cylinder temperature (° C) | Cycle time sec | Friction coefficient (μ) (linear speed 1 cm/sec) | Condition of wear | |
| Example 3-6 | 90 | 5 | 5 | 1 | Good | 230 | 60 | 0.05–0.10 | Absolutely no wear observed. | Practically no wetting |
| Comparative Example 3-5 | 99.9 | 0.05 | 0.05 | 1 | Good | 230 | 60 | 0.35–0.40 | Worn powder appeared over 10cm/sec. | None |
| Example 3-7 | 99 | 0.5 | 0.5 | 1 | Good | 230 | 60 | 0.20–0.25 | Absolutely no wear observed. | None |
| Example 3-8 | 70 | 15 | 15 | 1 | Good | 230 | 60 | 0.05–0.10 | Absolutely no wear observed. | Practically no wetting |
| Comparative Example 3-6 | 40 | 30 | 30 | 1 | Pelletization was difficult because of low stiffness | 230 | 80 | 0.05–0.10 | Sample was deformed because of low stiffness. | Wetting |
| Comparative Example 3-7 | 90 | 9.9 | 0.1 | 99 | No transportation was obtained with extruder | — | — | — | — | — |
| Example 3-9 | 90 | 6.7 | 3.3 | 2 | Good | 230 | 60 | 0.05–0.10 | Absolutely no wear observed. | Practically no wetting |
| Example 3-10 | 88 | 9 | 3 | 3 | Good | 230 | 60 | 0.05–0.10 | Absolutely no wear observed. | Practically no wetting |
| Example 3-11 | 90 | 3.3 | 0.7 | 0.5 | Good | 230 | 60 | 0.10–0.15 | Absolutely no wear observed. | None |
| Comparative Example 3-8 | 90 | 0.1 | 9.9 | 0.01 | Good | 230 | 60 | 0.30–0.35 | Worn powder appeared over 10cm/sec. | None |

Table 3

Test for moldability and physical properties (3)

| Test for moldability & physical properties (3) | Formulation (percent by weight) | | | | Moldability | | | Friction property and wear resistance test (test condition -resin-to-resin under load of 2 kg/cm²) | | Surface wetting of molded product with bleeded out oil |
|---|---|---|---|---|---|---|---|---|---|---|
| | Base resin | Lubricant | Ethylene-vinyl acetate copolymer | Additive | Molding process | Cylinder temperature (° C) | Cycle time (sec) | Friction coefficient (μ) (linear speed 1 cm/sec) | Condition of wear | |
| Example 4 | Polyacetal (80) | Paraffin type oil (5) | EVA (VA content 19% by weight) (5) | Glass fiber (10) | Injection molding | 200 | (50) | 0.10–0.15 | Absolutely no wear observed. | Practically no wetting |
| Comparative Example 4-1 | Polyacetal (85) | Paraffin type oil (5) | — | Glass fiber (10) | Injection molding | 200 | (∞) No transportation | — | — | — |
| Comparative Example 4-2 | Polyacetal (85) | Paraffin type oil (5) | — | Glass fiber (10) | Compression molding | — | — | 0.10–0.15 | Absolutely no wear observed. | Unusually heavy wetting observed. |
| Comparative Example 4-3 | Polyacetal (90) | — | — | Glass fiber (10) | Injection molding | 200 | (50) | 0.35–0.40 | Worn powder appeared over 5 cm/sec | None |

Table 3-continued

Test for moldability and physical properties (3)

| Test for moldability & physical properties (3) | Formulation (percent by weight) | | | | Moldability | | | Friction property and wear resistance test (test condition -resin-to-resin under load of 2 kg/cm²) | | Surface wetting of molded product with bleeded out oil |
| --- | --- | --- | --- | --- | --- | --- | --- | --- | --- | --- |
| | Base resin | Lubricant | Ethylene -vinyl acetate copolymer | Additive | Molding process | Cylinder temperature (°C) | Cycle time (sec) | Friction coefficient ($\mu$) (linear speed 1 cm/sec) | Condition of wear | |
| Example 5 | Poly-acetal (88) | Paraffin type oil (5) | EVA (VA content 19% by weight) (5) | MoS$_2$ (2) | Injection molding | 200 | (45) | 0.10-0.15 | Absolutely no wear observed. | Practically no wetting |
| Comparative Example 5-1 | Poly-acetal (93) | Paraffin type oil (5) | — | MoS$_2$ (2) | Injection molding | 200 | ($\infty$) No transportation | — | — | — |
| Comparative Example 5-2 | Poly-acetal (93) | Paraffin type oil (5) | — | MoS$_2$ (2) | Compression molding | — | — | 0.10-0.15 | Absolutely no wear observed. | Unusually heavy wetting observed. |
| Comparative Example 5-3 | Poly-acetal (98) | — | — | MoS$_2$ (2) | Injection molding | 200 | (45) | 0.30-0.35 | Worn powder appeared over 10 cm/sec. | None |
| Example 6 | Poly-acetal (85) | Paraffin type oil (5) | EVA (VA content 19% by weight) (5) | Graphite (5) | Injection molding | 200 | (45) | 0.10-0.15 | Absolutely no wear observed. | Practically no wetting |
| Example 6-1 | Poly-acetal (85) | Paraffin type oil (5) | — | Graphite (5) | Injection molding | 200 | ($\infty$) No transportation | — | — | — |
| Example 6-2 | Poly-acetal (85) | Paraffin type oil (5) | — | Graphite (5) | Compression molding | — | — | 0.10-0.15 | Absolutely no wear observed. | Unusually heavy wetting observed. |
| Example 6-3 | Poly-acetal (85) | — | — | Graphite (5) | Injection molding | 200 | (45) | 0.30-0.35 | Worn powder appeared over 20 cm/sec. | None |

Table 4

Test for moldability and physical properties (4)

| Test for moldability & physical properties (4) | Formulation (percent by weight) | | | | Degree of pelletization of composition | Moldability (by injection molding) | | Friction property and wear resistance test (test condition-resin-to-resin, under load of 2 kg/cm²) | | Surface wetting of molded product with bleeded out oil |
| --- | --- | --- | --- | --- | --- | --- | --- | --- | --- | --- |
| | Base resin | Lubricant | EVA (vinyl acetate content: 19% by weight) | Oil (wt %) / EVA (wt %) | | Cylinder temperature | Cycle time (sec) | Friction coefficient ($\mu$) (linear speed 1 cm/sec.) | Condition of wear | |
| Example 7 | Poly-acetal 90 | Aromatic type oil 5 | 5 | 1 | Good | 200 | 45 | 0.10-0.15 | Absolutely no wear observed. | Practically no wetting |
| Example 8 | Poly-acetal 90 | Poly-alkylene glycol oil 5 | 5 | 1 | Good | 200 | 45 | 0.10-0.15 | Absolutely no wear observed. | Practically no wetting |
| Example 9 | Poly-acetal 90 | Butyl stearate 5 | 5 | 1 | Good | 200 | 45 | 0.10-0.15 | Absolutely no wear observed. | Practically no wetting |
| Example 10 | Poly-acetal 90 | Dioctyl sebacate 5 | 5 | 1 | Good | 200 | 45 | 0.10-0.15 | Absolutely no wear observed. | Practically no wetting |
| Example 11 | Poly-acetal 90 | Dioctyl phthalate 5 | 5 | 1 | Good | 200 | 45 | 0.10-0.15 | Absolutely no wear observed. | Practically no wetting |
| Example 12 | Poly-acetal 90 | Tricresyl phosphate 5 | 5 | 1 | Good | 200 | 45 | 0.10-0.15 | Absolutely no wear observed. | Practically no wetting |

Table 4-continued

| Test for moldability & physical properties (4) | Formulation (percent by weight) | | | | Degree of pelletization of composition | Moldability (by injection molding) | | Friction property and wear resistance test (test condition-resin-to-resin, under load of 2 kg/cm²) | | Surface wetting of molded product with bleeded out oil |
|---|---|---|---|---|---|---|---|---|---|---|
| | Base resin | Lubricant | EVA (vinyl acetate content: 19% by weight) | Oil (wt %) / EVA (wt %) | | Cylinder temperature | Cycle time (sec) | Friction coefficient (μ) (linear speed 1 cm/sec.) | Condition of wear | |
| Example 13 | Nylon 90 | Aromatic type oil 5 | 5 | 1 | Good | 230 | 60 | 0.05–0.10 | Absolutely no wear observed. | Practically no wetting |
| Example 14 | Nylon 90 | Polyalkylene glycoloil 5 | 5 | 1 | Good | 230 | 60 | 0.05–0.10 | Absolutely no wear observed. | Practically no wetting |
| Example 15 | Nylon 90 | Butyl stearate 5 | 5 | 1 | Good | 230 | 60 | 0.05–0.10 | Absolutely no wear observed. | Practically no wetting |
| Example 16 | Nylon 90 | Dioctyl Sebacate 5 | 5 | 1 | Good | 230 | 60 | 0.05–0.10 | Absolutely no wear observed. | Practically no wetting |
| Example 17 | Nylon 90 | Dioctyl phthalate 5 | 5 | 1 | Good | 230 | 60 | 0.05–0.10 | Absolutely no wear observed. | Practically no wetting |
| Example 18 | Nylon 90 | Tricresyl phosphate 5 | 5 | 1 | Good | 230 | 60 | 0.05–0.10 | Absolutely no wear observed. | Practically no wetting |

Table 5

| Test for moldability & physical properties (5) | Formulation (percent by weight) | | | | Degree of pelletization of composition | Moldability (by injection molding) | | Lubricity & wear resistance test (test condition-resin-to-resin under load of 2kg/cm²) | | Surface wetting of molded product from bleed out oil |
|---|---|---|---|---|---|---|---|---|---|---|
| | Base resin | Naphthene type oil | EVA (vinyl acetate content: 28% by weight) | Oil (wt %) / EVA (wt %) | | Cylinder temperature (° C) | Cycle time (sec) | Friction coefficient (μ) (linear speed 1cm/sec) | Condition of wear | |
| Example 19 | Acetal Copolymer 90 | 5 | 5 | 1 | Good | 200 | 45 | 0.10–0.15 | Absolutely no wear observed. | Practically no wetting |
| Example 20 | Nylon 6.6 90 | 5 | 5 | 1 | Good | 280 | 60 | 0.05–0.10 | Absolutely no wear observed. | Practically no wetting |
| Example 21 | Nylon 6.10 90 | 5 | 5 | 1 | Good | 240 | 60 | 0.10–0.15 | Absolutely no wear observed. | Practically no wetting |
| Example 22 | Nylon 6 containing 20 wt % glass fiber 90 | 5 | 5 | 1 | Good | 230 | 60 | 0.10–0.15 | Absolutely no wear observed. | Practically no wetting |
| Example 23 | Nylon 66 containing 10 wt % graphite 90 | 5 | 5 | 1 | Good | 280 | 60 | 0.05–0.10 | Absolutely no wear observed. | Practically no wetting |

The foregoing examples illustrate the remarkable results which are achieved with a variety of polyacetals and nylons in accordance with the practice of this invention. Similar results are achieved in other specific examples with additional thermoplastic resins including polyethylene, polypropylene, polyphenylene sulfide and polysulfone.

What is claimed is:

1. A thermoplastic resin composition having excellent lubricity and wear resistance comprising from 55 to 99.5 percent by weight of thermoplastic polyacetal, from 0.3 to 25 percent by weight of a liquid lubricant which does not dissolve the resin, and from 0.2 to 20 percent by weight of an ethylene-vinyl acetate copolymer which contains from 15 to 50 percent by weight of vinyl acetate comonomer.

2. A composition as in claim 1 wherein the lubricant is selected from the group consisting of paraffin type oils, naphthene type oils, aromatic type oils, polyalkylene glycol type oils and ester type oils.

3. A composition as in claim 1 wherein the ethylene-vinyl acetate copolymer contains from 19 to 28 percent by weight of vinyl acetate comonomer.

4. A composition as in claim 1, wherein the polyacetal resin is selected from the group consisting of acetal homopolymer and acetal copolymer containing 1 – 10 mol % of cyclic ether.

5. A composition as in claim 1, wherein the thermoplastic resin content is from 70 to 98 percent by weight, the lubricant content is from 1 to 15 percent by weight, and the ethylene-vinyl acetate copolymer content is from 1 to 15 percent by weight.

* * * * *